United States Patent
Manullang et al.

(10) Patent No.: US 9,715,257 B2
(45) Date of Patent: Jul. 25, 2017

(54) ACTIVE SCREEN PROTECTION FOR ELECTRONIC DEVICE

(71) Applicant: Apple Inc., Cupertino, CA (US)

(72) Inventors: Tyson B. Manullang, Sunnyvale, CA (US); Stephen B. Lynch, Portola Valley, CA (US); Emery A. Sanford, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 560 days.

(21) Appl. No.: 14/256,002

(22) Filed: Apr. 18, 2014

(65) Prior Publication Data

US 2015/0301565 A1  Oct. 22, 2015

(51) Int. Cl.
| | |
|---|---|
| *G06F 1/18* | (2006.01) |
| *G06F 1/16* | (2006.01) |
| *H04M 1/18* | (2006.01) |
| *H04M 1/02* | (2006.01) |

(52) U.S. Cl.
CPC ............ *G06F 1/182* (2013.01); *G06F 1/1637* (2013.01); *H04M 1/185* (2013.01); *H04M 1/0266* (2013.01); *H04M 2250/12* (2013.01)

(58) Field of Classification Search
CPC .... G06F 1/1637; G06F 1/182; H04M 1/0266; H04M 1/185; H04M 2250/12; H04M 1/02; H04M 1/0202; H04M 1/18; H04M 2250/00; H04B 1/3888
USPC .................................................. 340/3.1, 5.1
See application file for complete search history.

(56) References Cited

U.S. PATENT DOCUMENTS

| | | |
|---|---|---|
| 2,171,808 A | 9/1939 | Von Schlippe |
| 2,989,869 A | 6/1961 | Hanggi |
| 3,606,296 A | 9/1971 | Chassagne |
| 3,772,923 A | 11/1973 | Burt |
| 3,919,575 A | 11/1975 | Weber et al. |
| 4,278,726 A | 7/1981 | Wieme |
| 4,288,051 A | 9/1981 | Göschel |
| 4,314,735 A | 2/1982 | Fullenkamp et al. |
| 4,370,894 A | 2/1983 | Sturesson |

(Continued)

FOREIGN PATENT DOCUMENTS

| | | |
|---|---|---|
| CN | 1458804 | 11/2003 |
| CN | 2710238 | 7/2005 |

(Continued)

*Primary Examiner* — Brian Wilson
(74) *Attorney, Agent, or Firm* — Kendall W. Abbasi; David K. Cole

(57) ABSTRACT

An electronic device includes one or more screens, multiple screen protectors moveable between a retracted position and extended position where they extend above the screen to create a gap, and one or more sensors. When the sensor detects a drop event, the screen protectors move from the retracted to extended position, functioning as a shock absorber and preventing the screen from connecting with a surface that the electronic device contacts. In some implementations, the screen protectors may be multiple tabs that may be moved between the retracted and extended positions by one or more motors and/or other actuators coupled to one or more pinions. Such tabs may be formed of various flexible and/or rigid materials such as plastic, plastic film, polyethylene terephthalate or other polymers, metal, thin film metal, combinations thereof, and/or other such materials.

20 Claims, 8 Drawing Sheets

(56) References Cited

U.S. PATENT DOCUMENTS

| | | | |
|---|---|---|---|
| 4,452,292 A * | 6/1984 | Leivenzon | E06B 9/70 160/133 |
| 4,580,456 A | 4/1986 | Takano | |
| 4,849,580 A | 7/1989 | Reuter | |
| 4,940,336 A | 7/1990 | Dryga et al. | |
| 5,182,158 A | 1/1993 | Schaeffer | |
| 5,349,893 A | 9/1994 | Dunn | |
| 5,368,914 A | 11/1994 | Barrett | |
| 5,426,562 A | 6/1995 | Morehouse et al. | |
| 5,507,665 A | 4/1996 | Oda | |
| 5,587,854 A | 12/1996 | Sato et al. | |
| 5,606,341 A | 2/1997 | Aguilera | |
| 5,659,376 A | 8/1997 | Uehara et al. | |
| 5,666,261 A | 9/1997 | Aguilera | |
| 5,783,297 A | 7/1998 | Wise et al. | |
| 5,909,074 A | 6/1999 | Takaya et al. | |
| 5,936,600 A | 8/1999 | Ohashi et al. | |
| 5,965,249 A | 10/1999 | Sutton et al. | |
| 5,982,617 A | 11/1999 | Haley et al. | |
| 6,154,360 A | 11/2000 | Kaczeus et al. | |
| 6,262,888 B1 | 7/2001 | Siedow et al. | |
| 6,288,489 B1 | 9/2001 | Isohata et al. | |
| 6,323,757 B1 | 11/2001 | Nagai | |
| 6,324,054 B1 | 11/2001 | Chee et al. | |
| 6,373,702 B2 | 4/2002 | Oishi et al. | |
| 6,483,926 B1 | 11/2002 | Yamashita et al. | |
| 6,524,692 B1 | 2/2003 | Rosen | |
| 6,596,976 B2 | 7/2003 | Lin et al. | |
| 6,603,620 B1 | 8/2003 | Berding | |
| 6,627,818 B2 | 9/2003 | Kamel et al. | |
| 6,633,481 B2 | 10/2003 | Pavol | |
| 6,647,328 B2 | 11/2003 | Walker | |
| 6,664,491 B2 | 12/2003 | Yanai et al. | |
| 6,665,192 B2 | 12/2003 | Wimberger Friedl et al. | |
| 6,744,186 B2 | 6/2004 | Oishi et al. | |
| 6,809,916 B2 | 10/2004 | Nakata et al. | |
| 6,859,357 B2 | 2/2005 | Morimoto et al. | |
| 6,924,996 B2 | 8/2005 | Sugawara | |
| 6,968,954 B2 | 11/2005 | Hsieh | |
| 7,009,835 B2 | 3/2006 | Desai et al. | |
| 7,059,182 B1 * | 6/2006 | Ragner | H05K 5/0086 73/200 |
| 7,064,655 B2 | 6/2006 | Murray et al. | |
| 7,094,094 B2 | 8/2006 | Zahnen et al. | |
| 7,113,351 B2 | 9/2006 | Hovanky | |
| 7,133,281 B2 | 11/2006 | Bae | |
| 7,161,580 B2 | 1/2007 | Bailey et al. | |
| 7,167,360 B2 | 1/2007 | Inoue et al. | |
| 7,259,357 B2 | 8/2007 | Walker | |
| 7,260,885 B2 | 8/2007 | Albrecht et al. | |
| 7,354,315 B2 | 4/2008 | Goetz et al. | |
| 7,369,345 B1 | 5/2008 | Li et al. | |
| 7,373,863 B2 | 5/2008 | O'Banion et al. | |
| 7,375,645 B2 | 5/2008 | Tsai | |
| 7,382,567 B2 | 6/2008 | Liao et al. | |
| 7,393,575 B2 | 7/2008 | Boss | |
| 7,450,332 B2 | 11/2008 | Pasolini et al. | |
| 7,463,436 B2 | 12/2008 | Takahashi et al. | |
| 7,477,469 B2 | 1/2009 | Cook et al. | |
| 7,492,544 B2 | 2/2009 | Jeansonne et al. | |
| 7,525,751 B2 | 4/2009 | Han et al. | |
| 7,532,478 B2 | 5/2009 | Jeong | |
| 7,549,335 B2 | 6/2009 | Inoue et al. | |
| 7,554,798 B2 | 6/2009 | Tanokuchi et al. | |
| 7,568,942 B1 | 8/2009 | Lannon et al. | |
| 7,578,691 B2 | 8/2009 | Weksler et al. | |
| 7,607,610 B1 | 10/2009 | Sterchak et al. | |
| 7,612,994 B2 | 11/2009 | Ulrich et al. | |
| 7,619,891 B2 | 11/2009 | Woo et al. | |
| 7,643,243 B2 | 1/2010 | Lee et al. | |
| 7,652,892 B2 | 1/2010 | Shiu et al. | |
| 7,660,107 B2 | 2/2010 | Leung | |
| 7,684,183 B2 | 3/2010 | Mori et al. | |
| 7,760,289 B2 | 7/2010 | Nakanishi et al. | |
| 7,817,373 B2 | 10/2010 | Choi et al. | |
| 7,839,051 B2 | 11/2010 | Klinghult | |
| 7,855,892 B2 | 12/2010 | Lin | |
| 7,919,945 B2 | 4/2011 | Houston et al. | |
| 7,924,552 B2 | 4/2011 | Tseng | |
| 8,044,818 B2 | 10/2011 | Tysowski et al. | |
| 8,075,981 B2 | 12/2011 | Pearce et al. | |
| 8,093,811 B2 | 1/2012 | Tanokuchi et al. | |
| 8,106,789 B2 | 1/2012 | Yang et al. | |
| 8,144,453 B2 | 3/2012 | Brown et al. | |
| 8,189,280 B2 | 5/2012 | Ollila et al. | |
| 8,190,015 B2 | 5/2012 | Li et al. | |
| 8,248,777 B2 | 8/2012 | Prest | |
| 8,275,420 B2 | 9/2012 | Lim | |
| 8,289,689 B2 | 10/2012 | Chen et al. | |
| 8,289,715 B2 | 10/2012 | Takahara | |
| 8,305,744 B2 | 11/2012 | Shedletsky et al. | |
| 8,330,305 B2 | 12/2012 | Hart et al. | |
| 8,352,077 B2 | 1/2013 | Goswami et al. | |
| 8,368,641 B2 | 2/2013 | Tremblay et al. | |
| 8,411,432 B1 | 4/2013 | Zimlin et al. | |
| 8,421,763 B2 | 4/2013 | Liao | |
| 8,430,381 B2 | 4/2013 | Chen | |
| 8,446,475 B2 | 5/2013 | Topliss et al. | |
| 8,467,133 B2 | 6/2013 | Miller | |
| 8,485,053 B2 | 7/2013 | Lee et al. | |
| 8,503,121 B2 | 8/2013 | Osaka et al. | |
| 8,564,424 B2 | 10/2013 | Evarts et al. | |
| 8,694,251 B2 | 4/2014 | Janardhanan et al. | |
| 8,749,958 B2 | 6/2014 | Li | |
| 8,798,534 B2 | 8/2014 | Rodriguez et al. | |
| 8,862,182 B2 | 10/2014 | Shukla et al. | |
| 8,872,448 B2 | 10/2014 | Boldyrev et al. | |
| 8,896,995 B2 | 11/2014 | Shedletsky et al. | |
| 8,903,519 B2 | 12/2014 | King et al. | |
| 9,134,337 B2 | 9/2015 | Simoni et al. | |
| 9,167,061 B2 | 10/2015 | Shuster | |
| 9,300,776 B2 | 3/2016 | Petersen | |
| 2002/0169533 A1 * | 11/2002 | Browne | B60R 21/013 701/45 |
| 2005/0017396 A1 | 1/2005 | Pearce et al. | |
| 2006/0109581 A1 | 5/2006 | Lee et al. | |
| 2007/0106483 A1 | 5/2007 | Kelley et al. | |
| 2008/0024972 A1 | 1/2008 | Yamaguchi | |
| 2008/0091309 A1 | 4/2008 | Walker | |
| 2008/0163716 A1 | 7/2008 | Battlogg et al. | |
| 2008/0192124 A1 | 8/2008 | Nagasaki | |
| 2009/0219130 A1 | 9/2009 | Dai et al. | |
| 2009/0270133 A1 * | 10/2009 | Huang | H04M 1/185 455/566 |
| 2009/0273480 A1 | 11/2009 | Mittleman et al. | |
| 2009/0298548 A1 * | 12/2009 | Kim | H04M 1/72544 455/566 |
| 2010/0149073 A1 | 6/2010 | Chaum et al. | |
| 2010/0272969 A1 | 10/2010 | Taylor | |
| 2011/0040410 A1 | 2/2011 | Kim et al. | |
| 2011/0132114 A1 | 6/2011 | Siotis | |
| 2011/0167391 A1 * | 7/2011 | Momeyer | G06F 1/1684 715/863 |
| 2011/0228460 A1 | 9/2011 | Kim et al. | |
| 2011/0257765 A1 | 10/2011 | Evans et al. | |
| 2012/0212484 A1 | 8/2012 | Haddick et al. | |
| 2012/0212499 A1 | 8/2012 | Haddick et al. | |
| 2012/0234981 A1 | 9/2012 | Nagabhushan et al. | |
| 2013/0038278 A1 | 2/2013 | Park et al. | |
| 2013/0063885 A1 | 3/2013 | Shedletsky et al. | |
| 2013/0073095 A1 | 3/2013 | King et al. | |
| 2013/0077278 A1 | 3/2013 | Prest | |
| 2013/0090881 A1 | 4/2013 | Janardhanan et al. | |
| 2013/0100591 A1 | 4/2013 | Montevirgen et al. | |
| 2013/0127980 A1 | 5/2013 | Haddick et al. | |
| 2013/0218058 A1 | 8/2013 | Ceoldo et al. | |
| 2013/0257582 A1 | 10/2013 | Rothkopf et al. | |
| 2013/0278631 A1 | 10/2013 | Border et al. | |
| 2013/0285490 A1 | 10/2013 | Rothkopf et al. | |
| 2013/0319882 A1 * | 12/2013 | Berkovic | A45C 11/00 206/37 |
| 2014/0253284 A1 | 9/2014 | Peterson et al. | |

(56) References Cited

U.S. PATENT DOCUMENTS

2014/0260723 A1 9/2014 Ely et al.
2014/0273607 A1 9/2014 Orand et al.
2016/0154439 A1 6/2016 Rothkopf et al.

FOREIGN PATENT DOCUMENTS

| CN | 2794023 | 7/2006 |
| CN | 201230310 | 4/2009 |
| CN | 102857589 | 1/2013 |
| EP | 1057504 | 12/2000 |
| GB | 715773 | 9/1954 |
| GB | 1133198 | 11/1968 |
| JP | 2011099758 | 5/2011 |
| KR | 2004036970 | 5/2004 |
| TW | 501329 | 9/2002 |
| TW | I303192 | 11/2008 |
| WO | WO2010/135421 | 11/2010 |

* cited by examiner

ACTIVE SCREEN PROTECTION FOR ELECTRONIC DEVICE

TECHNICAL FIELD

This disclosure relates generally to electronic devices, and more specifically to active screen protection for electronic devices.

BACKGROUND

Many electronic devices, particularly portable electronic devices, include one or more screens. Such screens often include display screens, touch screens, touch pad screens, and/or other types of electronic device screens. Typically, such screens include one or more layers of glass and/or other fragile elements.

Electronic devices, particularly portable electronic devices, may be subject to various drop events. For example, an electronic device may fall from a table, fly from a user's hand when a user trips, and/or otherwise fall to the ground or other surface. Such drop events may damage glass layers and/or other fragile elements of screens included in the electronic devices. Repairing damage to screens may be expensive, burdensome, and/or impractical.

SUMMARY

The present disclosure discloses systems, apparatuses, and methods for active screen protection. An electronic device may include one or more screens (or cover glasses), multiple screen protectors moveable between a retracted position and extended position where they extend above the screen, and one or more sensors. When the sensor detects a drop event, the screen protectors may move from the retracted to extended position, functioning as a shock absorber and/or preventing the screen from connecting with a surface that the electronic device contacts.

The screen protectors may be multiple tabs. Such tabs may be formed of various flexible and/or rigid materials such as plastic, plastic film, polyethylene terephthalate or other polymers, metal, thin film metal, combinations thereof, and/or other such materials. In some implementations, the tabs may be moved between the retracted and extended positions by one or more motors and/or other actuators. The motor may be connected to one or more pinions that mate with multiple slots or teeth coupled to the tabs.

After the screen protectors move to the extended position in response to the sensor detecting a drop event, they may return to the retracted position. In various cases, the screen protectors may return to the retracted position when the sensor detects that the drop event is over, in response to one or more user inputs, upon expiration of a timer after the drop event is detected, when the sensor determines the electronic device is retrieved after the drop event, and/or at various other times subsequent to a drop event.

In one or more embodiments, a system for active screen protection may include an electronic device including at least one screen; multiple screen protectors moveable between at least an extended position and a retracted position, the multiple screen protectors extend above the at least one screen in the extended position to create at least one gap; and at least one sensor that detects when electronic device is subject to a drop event. The multiple screen protectors may move from the retracted position to the extended position when the at least one sensor detects that the electronic device is subject to the drop event.

In various embodiments, an electronic device may include at least one screen; multiple screen protectors moveable between at least an extended position and a retracted position, the multiple screen protectors extend above the at least one screen in the extended position to create at least one gap; and at least one sensor that detects when electronic device is subject to a drop event. The electronic device may move the multiple screen protectors from the retracted position to the extended position when the at least one sensor detects that the electronic device is subject to the drop event.

In some embodiments, a method for active screen protection includes: detecting when an electronic device that includes at least one screen is subject to a drop event utilizing at least one sensor and moving multiple screen protectors from a retracted position to an extended position in response to detection of the at least one drop event, the multiple screen protectors extend above the at least one screen in the extended position to create at least one gap.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
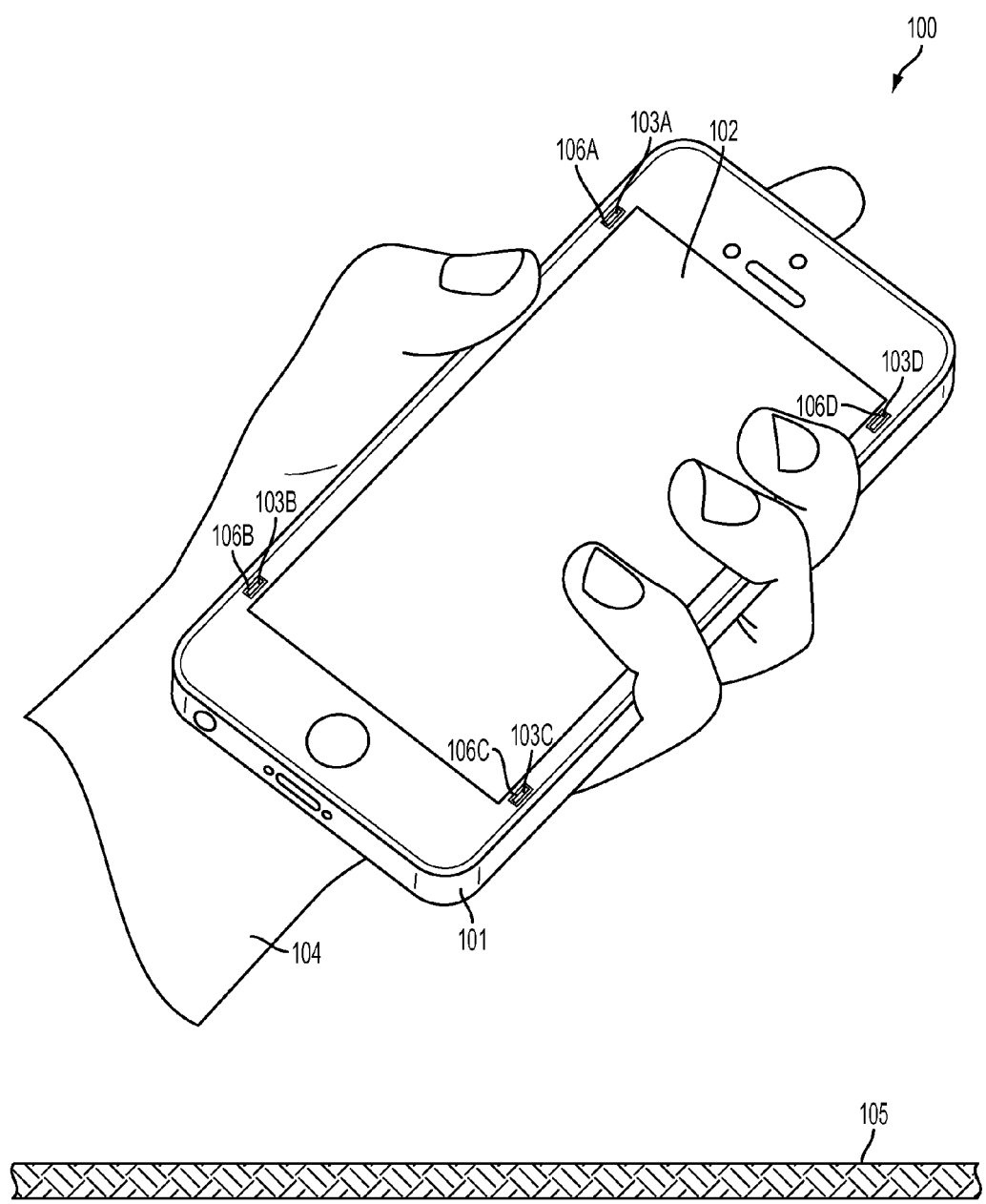
FIG. 1 is an isometric view illustrating an example system for active screen protection.

The description that follows includes sample systems, methods, and computer program products that embody various elements of the present disclosure. However, it should be understood that the described disclosure may be practiced in a variety of forms in addition to those described herein.

The present disclosure discloses systems, apparatuses, and methods for active screen protection. An electronic device may include one or more screens (or cover glasses), multiple screen protectors moveable between a retracted position and extended position where they extend above the screen to create a gap, and one or more sensors (such as an accelerometer, gyroscope, inertial sensor, motion sensor, camera, and/or other sensor) that detect when the electronic device experiences a drop event. Upon detection of a drop event, the screen protectors may move from the retracted to extended position. In this way, the screen protectors may function as a shock absorber and/or to prevent the screen from contacting a surface onto which the electronic device is dropped, actively protecting the screen.

The screen protectors may be multiple tabs. Such tabs may be formed of various flexible and/or rigid materials such as plastic, plastic film, polyethylene terephthalate or other polymers, metal, thin film metal, combinations thereof, and/or other such materials. In some implementations, these tabs may be positioned at each corner of the screen. However, in other implementations the tabs may be positioned at a variety of positions around the screen, such as at the sides of the screen and/or any other such positioning.

In the retracted position, the screen protectors may be flush with the screen or positioned below the screen and/or otherwise internal to the electronic device. In the extended position, the screen protectors may extend above the screen such that ends or other portions of the screen protectors contact a surface onto which the electronic device is dropped before the screen contacts the surface, thus preventing contact of the screen. In some implementations, the screen protectors may project over the screen while in their extended positions.

After the screen protectors move to the extended position in response to the sensor detecting a drop event, they may return to the retracted position. In various cases, the screen protectors may return to the retracted position when the sensor detects that the drop event is over, in response to one or more user inputs, upon expiration of a timer after the drop event is detected, when the sensor determines the electronic device is retrieved after the drop event, and/or at various other times subsequent to a drop event.

In some implementations, the screen protectors may be moved between the retracted and extended positions by one or more motors and/or other actuators. The motor may be connected a pinion that engages multiple slots or teeth in the screen protector and/or in an intermediate element coupled to the screen protector. Essentially, the screen protector may operate similar to a rack in a rack and pinion drive, converting the rotational motion of the pinion (and motor) to a linear motion. In some cases, each screen protector may be connected to, and thus moved by, a dedicated motor. In other cases, a single motor may be configured to move multiple screen protectors.

FIG. 1 is an isometric view illustrating an example system 100 for active screen protection. As illustrated, a user 104 is holding an electronic device 101 above a surface 105. In this example, the surface is the ground. However, it is understood that this is an example and the surface may be any surface (such as a table top, counter, floor, and so on) onto which the electronic device may experience a drop event.

Figure 2:
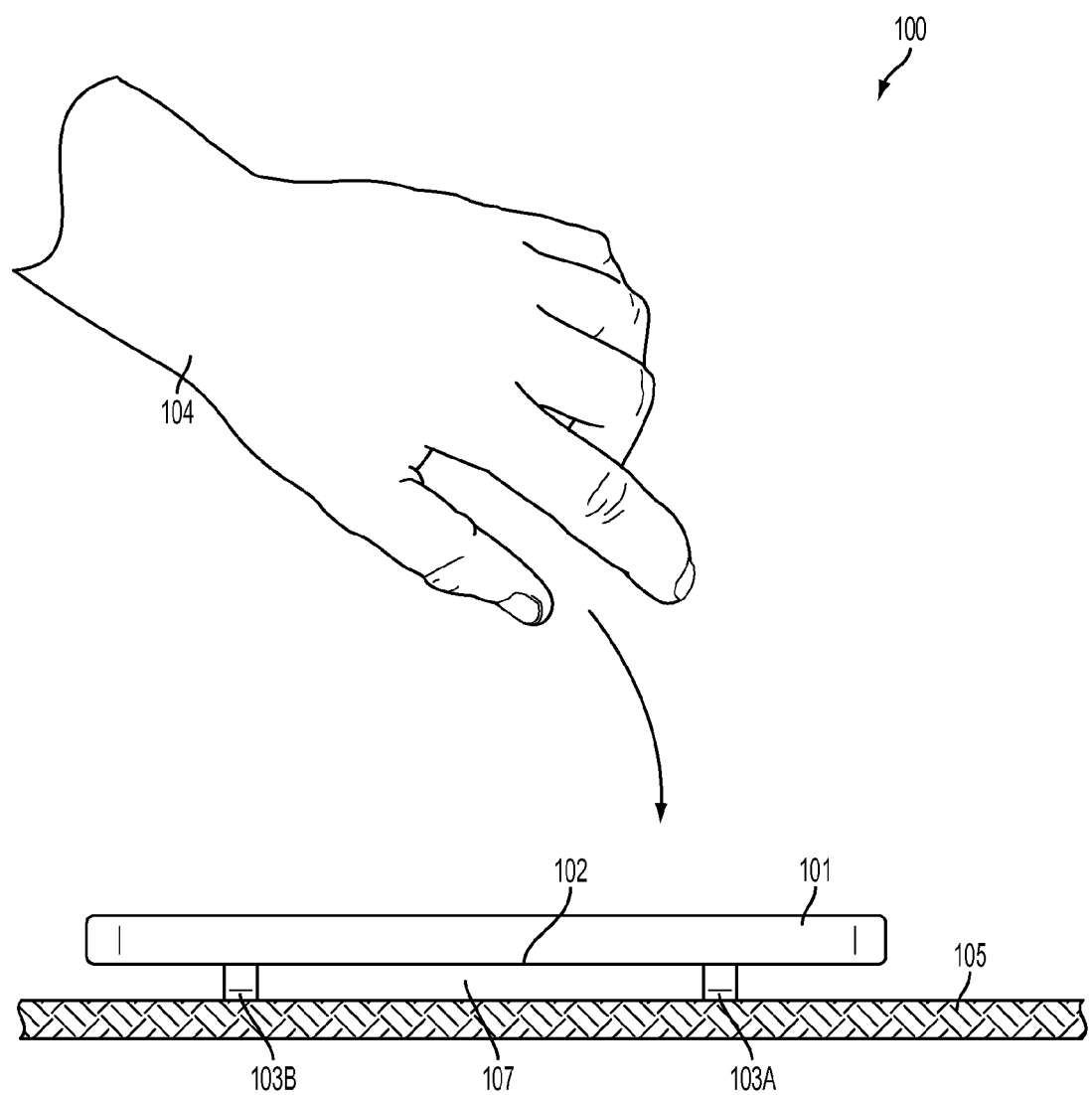
FIG. 2 illustrates the example system of FIG. 1 after occurrence of a drop event.

The electronic device 101 may include one or more screens 102 and one or more aperture 106a-106d through which one or more screen protectors 103a-103d may extend from a retracted position (as shown in FIG. 1) to an extended position (see FIG. 2).

Though the electronic device 101 is illustrated as a smart phone with a single screen 102, it is understood that this is an example. In various implementations, the electronic device may be any kind of electronic device (such as a smart phone, cellular telephone, tablet computing device, digital media player, mobile computing device, laptop computing device, wearable device, and/or other such electronic device) that includes one or more screens without departing from the scope of the present disclosure. Further, though the screen is illustrated as a touch screen/display, it is understood that this is an example. In various implementations, the screen may be any kind of screen (such as one or more displays, touch screens, touch pads, and/or any other kind of screen device) without departing from the scope of the present disclosure.

FIG. 2 illustrates the example system 100 of FIG. 1 after occurrence of a drop event, which may be detected by one or more sensors such as one or more accelerometers, gyroscopes, inertial sensors, motion sensors, cameras, and/or other sensors. As illustrated, the user 104 may lose control of the electronic device 101, causing the electronic device to fall to the surface 105.

For example, the sensor(s) may include one or more cameras that capture image data that is analyzed by a processing unit (such as utilizing motion capture software) to detect the occurrence of a drop event based on determined proximity of the electronic device 101 to the surface 105 (such as increasing proximity compared to previously captured image data), velocity of the electronic device, altitude of the electronic device, and so on. By way of another example, the sensor(s) may include one or more accelerometers that capture acceleration data that is analyzed by a processing unit to detect the occurrence of a drop event based on determined acceleration or velocity of the electronic device. By way of still another example, the sensor(s) may include one or more audio components that emit a chirp or ultrasonic pulse and receive a reflection of such from the surface that is analyzed by a processing unit to detect the occurrence of a drop event based on determined height, speed, and so on of the electronic device. By way of yet another example, the sensor(s) may include one or more altitude sensors (such as a global positioning system sensor and/or other kind of sensor operable to detect altitude) that detect altitude data that is analyzed by a processing unit to detect the occurrence of a drop event based on determined altitude, velocity, and so on of the electronic device.

Although FIG. 2 illustrates a drop event as a user 104 dropping the electronic device 101 onto the surface 105, it is understood that this is an example. A drop event may be any set or sets of circumstances that causes an electronic device to contact a surface with force sufficient to potentially damage the screen 102. For example, the user may throw the electronic device at the surface, the electronic device may slip from a different surface onto the surface, and so on. Illustration and description of a drop event as the dropping of the electronic device onto the surface does not limit the scope of the present disclosure.

One or more processing units may receive signals from the sensor(s) that the processing unit interprets as signaling the occurrence of a drop event. The processing unit may then activate one or more motors, actuators, and/or other mechanisms to rotationally move the screen protectors 103a-103d from the retracted position to the extended position, as illustrated. In the extended position, the screen protectors may contact the surface upon impact, thus preventing the screen 102 and/or the electronic device 101 from contacting the surface. The screen protectors (which may be flexible) may therefore act as shock absorbers, absorbing the force of the electronic device 101 impacting the surface and/or protecting the screen from potential damage. As further illustrated, the ends of the screen protectors may contact the surface, actively protecting the screen by isolating the screen from the surface by a gap 107 and preventing the screen from coming into contact with the surface.

Figure 3A:
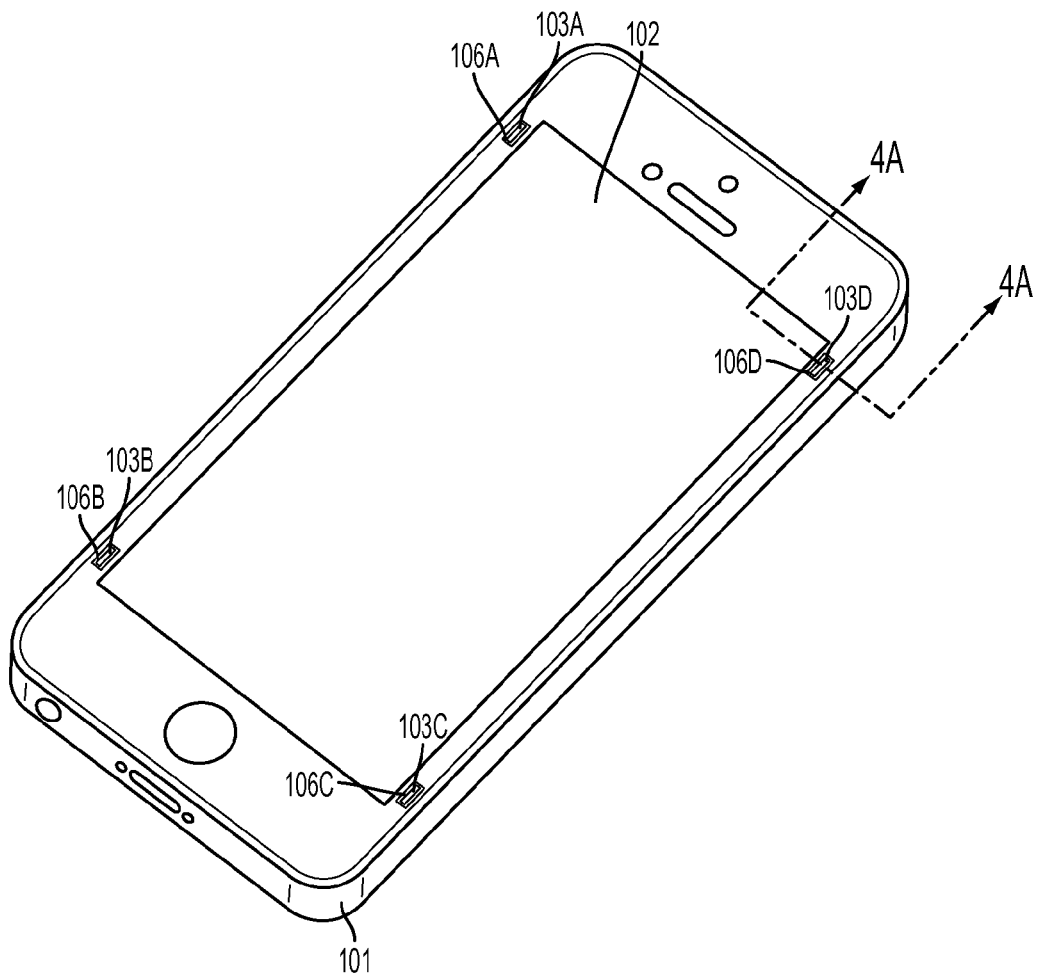
FIG. 3A is an isometric view of the electronic device of the example system of FIG. 1 with the screen protectors in a retracted position.
Figure 3B:
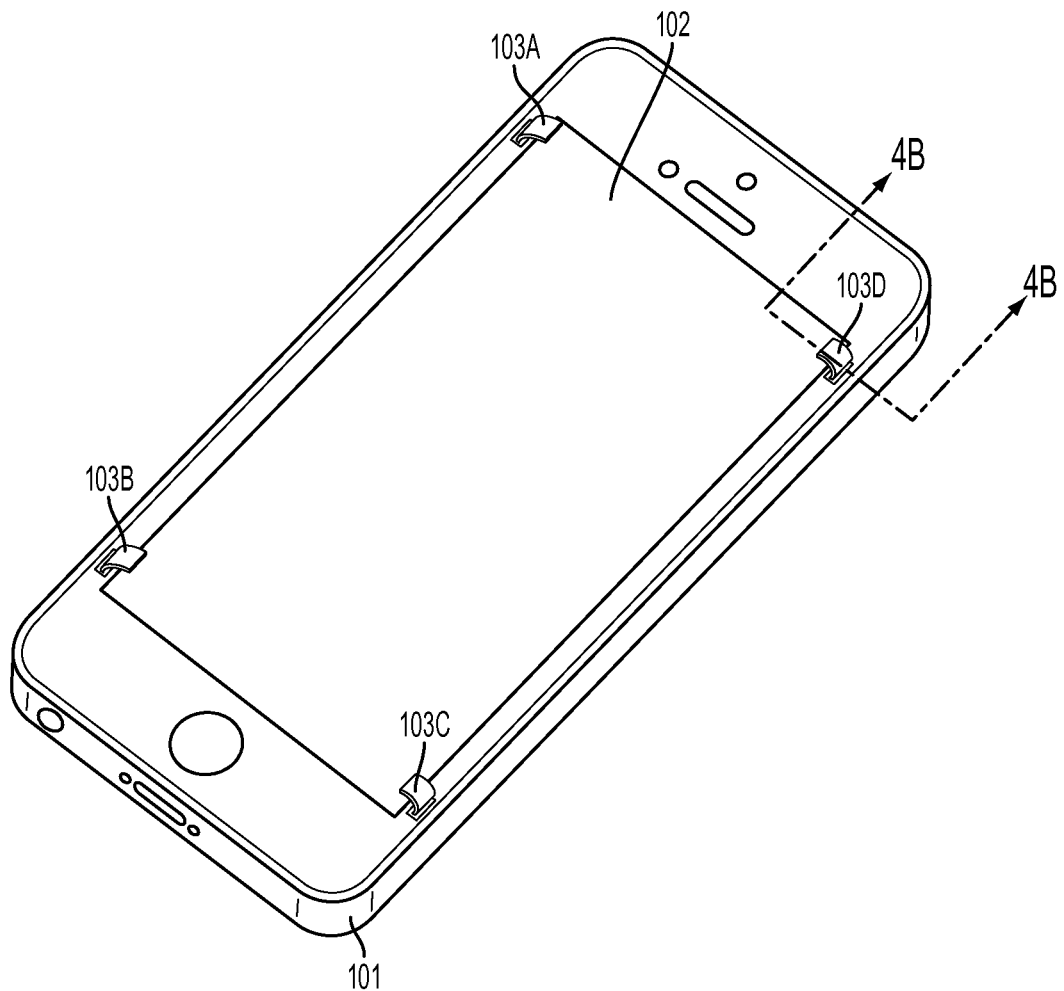
FIG. 3B illustrates the view shown in FIG. 3A with the screen protectors in the extended position.

FIG. 3A is an isometric view of the electronic device 101 of the example system 100 of FIG. 1 with the screen protectors 103a-103d in a retracted position. FIG. 3B illustrates the view shown in FIG. 3A with the screen protectors in the extended position.

As illustrated in FIGS. 3A and 3B, the screen protectors 103a-103d may be multiple tabs. As also illustrated, the tabs may be positioned at corners of the screen 102. However, it is understood that this is an example and that the tabs may be positioned at a variety of positions around the screen in various other implementations. Further, although the electronic device 101 is illustrated and described as including four tabs, it is understood that this is an example. In various implementations, any number of tabs (such as three or ten) may be utilized without departing from the scope of the present disclosure.

The tabs may be formed of various flexible and/or rigid materials. Such materials may include, but are not limited to, plastic, plastic film, polyethylene terephthalate or other polymers, metal, thin film metal, combinations thereof, and/or other such materials.

As shown in FIGS. 3A and 3B, the screen protectors 103a-103d may be flush with the screen 102 or positioned below the screen and/or otherwise internal to the electronic device 101 in the retracted position (see FIG. 3A). In various cases, the ends of the screen protectors may be formed of a similar material and/or otherwise have a similar and/or identical appearance to the housing of the electronic device such that the ends of the screen protectors are not readily discernable in the retracted position, although the ends are shown in FIG. 3A as visible for purposes of illustration. In the extended position (see FIG. 3B), the screen protectors may extend above the screen and/or project over the screen.

Figure 4A:
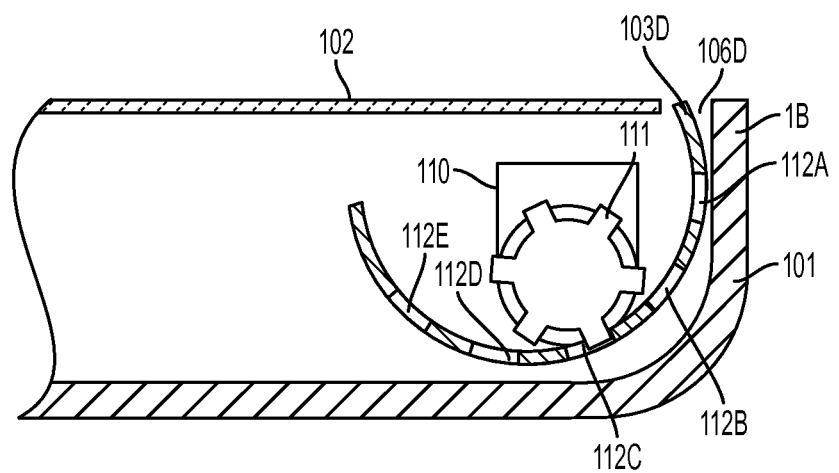
FIG. 4A is a cross-sectional view of an example implementation of the electronic device shown in FIG. 3A, taken along line 4A-4A of FIG. 3A.
Figure 4B:
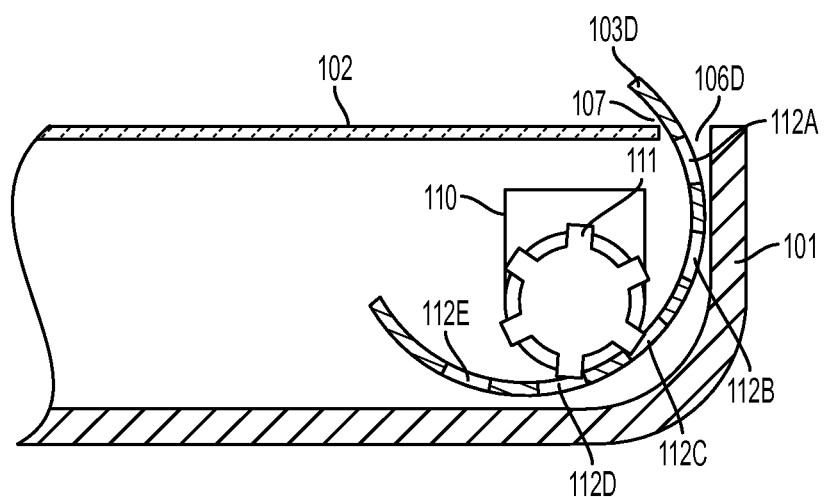
FIG. 4B is a cross-sectional view of the example implementation of the electronic device shown in FIG. 3B, taken along line 4B-4B of FIG. 3B.

FIG. 4A is a cross-sectional view of an example implementation of the electronic device 101 shown in FIG. 3A, taken along line 4A-4A of FIG. 3A. FIG. 4B is a cross-sectional view of the example implementation of the electronic device 101 shown in FIG. 3B, taken along line 4B-4B of FIG. 3B. As illustrated in FIG. 4A, the electronic device 101 may include one or more motors 110 (such as a rotary motor, a solenoid, a linear actuator, and/or other motors) and/or other actuators. The motor may connect to one or more pinions 111 that mate with one or more slots 112a-112e. By mating with the slots, when the pinion is rotated by the motor, the screen protector 103d may extend from (see FIG. 4B) or retract through the aperture 106d (see FIG. 4A), thus rotationally moving between the retracted (see FIG. 4A) and the extended (see FIG. 4B) positions. The screen protectors 103a-103c may be similarly operable.

As illustrated in FIGS. 3B and 4B, the screen protectors 103a-103d may curve over the screen 102 in their extended positions. As they may be flexible, impact may cause the screen protector elements to collapse inward toward the screen as opposed to forcing them back into the apertures 106a-d from which they extend. As a result of such collapse, force may not be transmitted back to the pinion 111 and/or the motor 110 upon impact. Exertion of force on the motor could cause the motor to experience torque and/or other forces opposite its normal and/or current direction of operation, resulting in unnecessary wear and/or other damage to the motor. However, as the collapse of the screen protectors may prevent exertion of force on the motor upon impact, unnecessary wear and/or other damage to the motor (and/or on other mechanisms utilized to move the screen protectors in embodiments where motors are not used) may be prevented.

Although the screen protectors 103a-103d are illustrated in FIGS. 3A-4B and described above as being tabs, it is understood that this is an example. In various implementations, the screen protectors may be elements other than tabs without departing from the scope of the present disclosure.

Moreover, although the screen protectors 103a-103d and/or one or more other components discussed above may be incorporated into the electronic device 101, in other implementations the screen protectors and/or one or more other components discussed above may be incorporated into a case, cover, or other element that is coupled to the electronic device. In such implementations, the screen protectors may be deployable to protect a screen 102 of the electronic device when the case, cover, or other element is coupled to the electronic device.

Further, although the screen protectors 103a-103d are illustrated and described as being rotationally moved between the retracted and extended positions by one or more motors or other actuators connected to one or more pinions, it is understood that this is an example. One or more other movement mechanisms may be utilized in various implementations without departing from the scope of the present disclosure.

For example, in various implementations the screen protectors 103a-103d may be mounted on one or more spring elements. Such spring elements may be biased toward the extended position and one or more restraint elements may restrain the spring elements in the retracted position. When a drop event is detected, the restraint elements may be released, thus allowing the biasing of the spring elements to move the screen protectors to the extended position. Subsequent to the drop event, the screen protectors may be manually returned to the retracted position by a user, recompressing the spring elements and engaging the restraint elements to again restrain the spring elements.

By way of another example, in various implementations the screen protectors 103a-103d may be coupled to a first set of magnetic elements configured to either be attracted to and/or repulsed by a second set of magnetic elements. When the first set of magnetic elements are attracted to the second set of magnetic elements, the screen protectors may be pulled at least partially into the electronic device 101 and may thus be configured in the retracted position. However, when the first set of magnetic elements are repulsed to the second set of magnetic elements, the screen protectors may be forced at least partially out of the electronic device 101 and may thus be configured in the extended position.

By way of still another example, in various implementations the screen protectors 103a-103d may be coupled to one or more motors and/or other actuators via a gear train and/or other system of interlocking gears. In such a case, the motor and/or other actuator may move the screen protectors between the extended and retracted position via the gear train.

By way of yet another example, in various implementations the screen protectors 103a-103d may be coupled to one or more motors and/or other actuators via direct linkage such as a four bar linkage, a crank arm, and/or other linkage. In such a case, the motor and/or other actuator may move the screen protectors between the extended and retracted position via the direct linkage.

By way of still another example, in various implementations the screen protectors 103a-103d may be coupled directly to one or more motors and/or other actuators. In such a case, the motor and/or other actuator may directly move the screen protectors between the extended and retracted position.

Additionally, although the screen protectors 103a-103d are illustrated in FIGS. 3A-4B are curved such that they extend over the screen 102 in the extended position, it is understood that this is an example. In various implementations, the screen protectors (or the portions of the screen protectors that extend from the apertures 106a-106d in the extended position) may be straight (such as at a 90 degree angle with respect to the screen), angled (such as projecting from the apertures over the screen at a 45 degree angle), and/or otherwise configured.

Moreover, although the screen protectors 103a-103d are illustrated in FIGS. 3A-4B as only extending through the apertures 106a-106d, it is understood that this is an example. In various implementations, the apertures may direct and/or otherwise assist in positioning the screen protectors and/or portions of the screen protectors that extend through the apertures. For example, the screen protectors may be composed of a flexible material that is straight and passes through apertures that are angled such that the apertures direct the straight and flexible material at an angle above the screen 102. By way of another example, the screen protectors may be composed of a flexible and curved material and the apertures may be straight such that portions of the curved and flexible material within the apertures are held straight but portions extending through the apertures are allowed to curve.

As illustrated and described above, the screen protectors 103a-103d may rotationally move from the retracted position to the extended position when an accelerometer, gyroscope, inertial sensor, motion sensor, altitude sensor, global positioning system sensor, and/or other sensor of the electronic device 101 determines that the electronic device experiences a drop event. After the screen protectors move to the extended position, the screen protectors may return to the retracted position. The screen protectors may return to the retracted position from the extended position upon the occurrence of one or more of a variety of different events.

By way of a first example, the screen protectors 103a-103d may return to the retracted position when a sensor detects that the drop event is over. In a first case, the sensor (such as an accelerometer) may detect a drop event by determining that the electronic device 101 experiences a sudden acceleration. After the sensor detects that acceleration is no longer detected, the sensor may determine that the drop event is over and the screen protectors may return to the retracted position.

In a second case, the sensor (such as a gyroscope) may detect a drop event by determining that the electronic device 101 has become unstable. After the sensor detects that the electronic device is again stable, the sensor may determine that the drop event is over and the screen protectors 103a-103d may return to the retracted position.

In a third case, the sensor (such as a camera) may detect a drop event by determining that captured images indicate that the electronic device 101 is in motion. After the sensor detects that the electronic device is no longer moving, the sensor may determine that the drop event is over and the screen protectors 103a-103d may return to the retracted position.

In a fourth case, the sensor (such as an audio component) may detect a drop event by determining that reflections of emitted chirps or ultrasonic pulses are received at increasingly shorter times. After the sensor detects that the times between reflections of emitted chirps or ultrasonic pulses are no longer shortening, the sensor may determine that the drop event is over and the screen protectors 103a-103d may return to the retracted position.

In a fifth case, the sensor (such as an altitude sensor) may detect a drop event by determining that the altitude of the electronic device 101 is decreasing. After the sensor detects that the altitude of the electronic device is no longer decreasing, the sensor may determine that the drop event is over and the screen protectors 103a-103d may return to the retracted position.

By way of a second example, the screen protectors 103a-103d may return to the retracted position in response to one or more user inputs. For example, after a drop event has been detected, the screen protectors may return to the retracted position only when a user provides an input (such as pushing one or more buttons, touching one or more touch screens, speaking one or more voice commands, shaking or otherwise moving the electronic device 101, and/or otherwise providing input) indicating that the screen protectors should be retracted.

By way of a third example, the screen protectors 103a-103d may return to the retracted position upon expiration of a timer after the drop event is detected. For example, detection of a drop event may start a timer (such as a thirty second timer). Upon expiration of the timer, the screen protectors may be retracted.

By way of a fourth example, the screen protectors 103a-103d may return to the retracted position when the sensor determines the electronic device is retrieved after the drop event. For example, the sensor may detect a drop event by determining that the electronic device 101 experiences a sudden acceleration. After the sensor no longer detects acceleration and then detects a subsequent acceleration, indicating that the electronic device has been picked up and/or otherwise retrieved after the drop event, the screen protectors may be retracted.

By way of a fifth example, the screen protectors 103a-103d may be operable to be manually returned to the retracted position as opposed to moving via one or more motors and/or other actuators. For example, the screen protectors may be operable to be pushed back to the retracted position by a user in some implementation after the screen protectors have moved to the extended position.

Although various examples of events that may cause retraction of the screen protectors 103a-103d are discussed above, it is understood that these are examples. In various implementations, the screen protectors may move from the extended position to the retracted position under a variety of different conditions without departing from the scope of the present disclosure.

Figure 5:
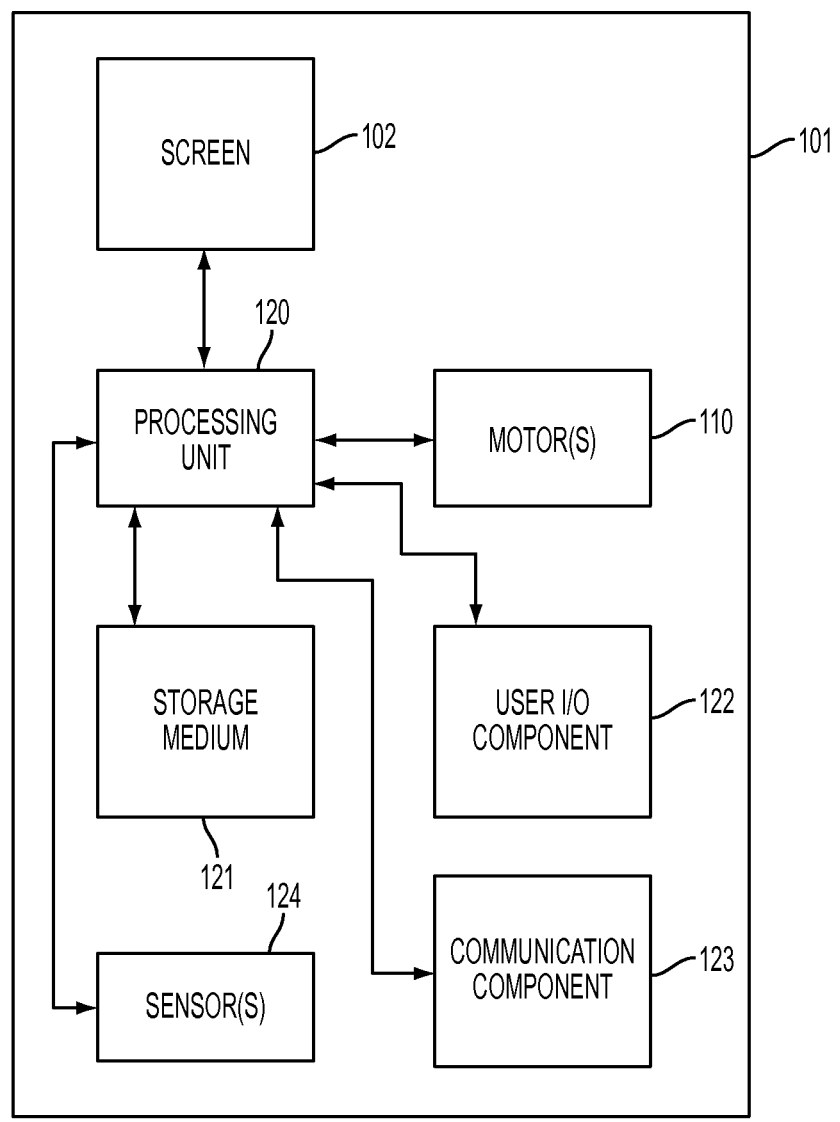
FIG. 5 is a block diagram illustrating the functional relationship of possible components of the electronic device of the example system of FIG. 1.

FIG. 5 is a block diagram illustrating the functional relationship of possible components of the electronic device 101 of the example system of FIG. 1. Although particular components are illustrated, it is understood that this is an example. In various implementations, the electronic device may include one or more components not shown, omit one or more components shown, and/or may include components configured in a different functional relationship without departing from the scope of the present disclosure.

In some implementations, the electronic device 101 may include one or more sensors 124 (such as one or more accelerometers, gyroscopes, inertial sensors, motion sensors, altitude sensor, global positioning system sensor, cameras, and/or other sensors operable to detect when the electronic device experiences a drop event), one or more processing units 120 and/or other controllers, one or more non-transitory storage media 121 (which may take the form of, but is not limited to, a magnetic storage medium; optical storage medium; magneto-optical storage medium; read only memory; random access memory; erasable programmable memory; flash memory; and so on), one or more user input/output components 122 (such as one or more buttons, touch screens, keyboards, mice, virtual keyboards, track pads, touch pads, displays, speakers, microphones, and/or other such user input/output components), one or more communication components 123 (such as one or more WiFi antennas, Bluetooth antennas, Ethernet adapters, near field communication antennas, and/or other such communication components), one or more screens 102, one or more motors and/or other actuators 110, and so on.

Figure 6:
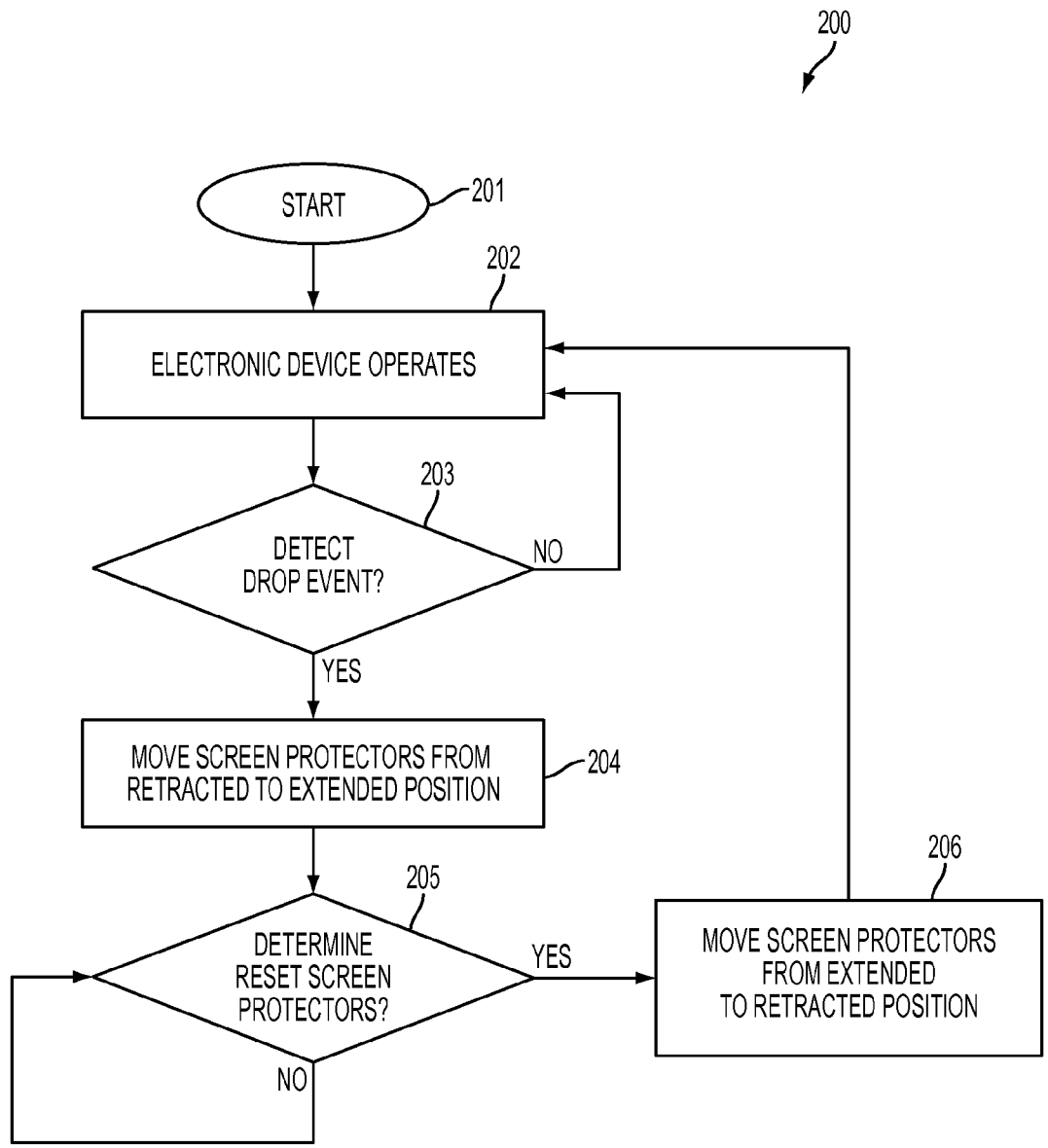
FIG. 6 is a flow chart illustrating a method for active screen protection. This method may be performed by the example system of FIGS. 1-5.

FIG. 6 is a flow chart illustrating a method 200 for active screen protection. This method may be performed by the example system of FIGS. 1-5.

The flow begins at block 201 and proceeds to block 202 where an electronic device operates. The flow then proceeds to block 203 where one or more sensors determine whether or not the electronic device experiences a drop event. If so, the flow proceeds to block 204. Otherwise, the flow returns to block 202 where the electronic device continues to operate.

At block 204, after the sensor determines that the electronic device experiences a drop event, one or more screen protectors rotationally move from a retracted position to an extended position. The flow then proceeds to block 205.

At block 205, after the screen protectors move from the retracted position to the extended position, the electronic device determines whether or not to reset the screen protectors to the retracted position. Such a determination may be based in various implementations on the occurrence of one or more events, such as detection that the drop event is over, receipt of one or more user inputs, expiration of one or more timers, detection that the electronic device is retrieved after the drop events, and/or any other kind of event or occurrence. If so, the flow proceeds to block 206. Otherwise, the flow returns to block 205 where the electronic device determines whether or not to reset the screen protectors to the retracted position.

At block 206, after the electronic device determines to reset the screen protectors to the retracted position, the screen protectors move from the extended position to the retracted position. The flow then returns to block 202 where the electronic device continues to operate.

Although the method 200 is illustrated and described as including particular operations performed in a particular order, it is understood that this is an example. In various implementations, various combinations of the same, similar, and/or different operations may be performed in a variety of different orders without departing from the scope of the present disclosure.

For example, the method 200 includes block 205 where the electronic device determines whether or not to reset the screen protectors before resetting. However, in other implementations the screen protectors may automatically reset after moving to the extended position from the retracted position. As such, block 204 may proceed directly to block 206 in such implementations without performance of block 205.

As described above and illustrated in the accompanying figures, the present disclosure discloses systems, apparatuses, and methods for active screen protection. An electronic device may include one or more screens, multiple screen protectors moveable between a retracted position and extended position where they extend above the screen to create a gap, and one or more sensors (such as an accelerometer, gyroscope, inertial sensor, motion sensor, camera, altitude sensor, global positioning system sensor, and/or other sensor) that detect when the electronic device experiences a drop event. Upon detection of a drop event, the screen protectors may move from the retracted to extended position. In this way, the screen protectors may function as a shock absorber and to prevent the screen from contacting a surface onto which the electronic device is dropped, actively protecting the screen.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for active screen protection for an electronic device including at least one screen, the system comprising:
    multiple screen protectors rotationally moveable between at least an extended position and a retracted position below the at least one screen, wherein the multiple screen protectors extend above and overlap the at least one screen in the extended position to create at least one gap between the at least one screen and the multiple screen protectors, and wherein the at least one screen overlaps the multiple screen protectors when the multiple screen protectors are in the retracted position; and
    at least one sensor that detects when the electronic device is subject to a drop event;
    wherein the multiple screen protectors rotationally move from the retracted position to the extended position when the at least one sensor detects that the electronic device is subject to the drop event.

2. The system of claim 1, wherein a first portion of each of the multiple screen protectors is flush with the at least one screen in the retracted position and a second portion of each of the multiple screen protectors is positioned below the at least one screen in the retracted position.

3. The system of claim 1, wherein the multiple screen protectors comprise multiple tabs.

4. The system of claim 3, wherein the multiple tabs comprise at least one of plastic, plastic film, polyethylene terephthalate, a polymer, thin metal, or metal.

5. The system of claim 3, wherein the multiple tabs comprise at least one tab positioned at each corner of the at least one screen.

6. The system of claim 1, wherein the multiple screen protectors absorb shock when the electronic device impacts a surface as a result of the drop event.

7. The system of claim 6, wherein the at least one gap is positioned between ends of the multiple screen protectors and the surface after the drop event.

8. The system of claim 1, wherein the at least one sensor comprises at least one accelerometer, gyroscope, inertial sensor, camera, altitude sensor, global positioning system sensor, or motion sensor.

9. The system of claim 1, wherein the multiple screen protectors rotationally move from the extended position to the retracted position when at the at least one sensor detects that the drop event is over.

10. The system of claim 1, further comprising at least one motor that rotationally moves the multiple screen protectors between the extended position and the retracted position.

11. The system of claim 10, wherein the at least one motor rotationally moves the multiple screen protectors by moving at least one pinion.

12. The system of claim 11, wherein the at least one pinion mates with multiple slots coupled to the multiple screen protectors.

13. The system of claim 10, wherein the at least one motor comprises multiple motors and each of the multiple screen protectors is rotationally moved by a different one of the multiple motors.

14. The system of claim 10, wherein the at least one motor comprises multiple motors and at least one of the multiple motors rotationally moves at least two of the multiple screen protectors.

15. The system of claim 1, further comprising a plurality of apertures in the electronic device, wherein each of the multiple screen protectors passes through a respective one of the apertures to move from the retracted position to the extended position.

16. The system of claim 1, wherein the multiple screen protectors rotationally move from the extended position to the retracted position in response to at least one user input.

17. The system of claim 1, wherein the multiple screen protectors rotationally move from the extended position to the retracted position upon expiration of at least one timer after detection of the drop event.

18. The system of claim 1, wherein the multiple screen protectors rotationally move from the extended position to the retracted position when at the at least one sensor detects that the electronic device is retrieved after the drop event.

19. An electronic device, comprising:
a housing that separates an interior of the housing from an exterior of the housing;
at least one screen mounted in the housing;
a plurality of apertures in the housing around the periphery of the at least one screen;
multiple screen protectors moveable between at least an extended position and a retracted position, the multiple screen protectors extend above the at least one screen in the extended position to create at least one gap, wherein the multiple screen protectors are located entirely within the interior of the housing when the multiple screen protectors are in the retracted position; and
at least one sensor that detects when the electronic device is subject to a drop event;
wherein each of the multiple screen protectors passes through a respective one of the apertures to move from the interior of the housing in the retracted position to the exterior of the housing in the extended position when the at least one sensor detects that the electronic device is subject to the drop event.

20. A method for active screen protection, the method comprising:
detecting when an electronic device that includes at least one screen is subject to a drop event utilizing at least one sensor; and
rotationally moving multiple screen protectors from a retracted position below the at least one screen to an extended position in response to detection of the at least one drop event, wherein the multiple screen protectors extend above the at least one screen in the extended position to create at least one gap, and wherein the at least one screen overlaps the multiple screen protectors when the multiple screen protectors are in the retracted position.

* * * * *